(12) United States Patent
Smith et al.

(10) Patent No.: US 7,337,127 B1
(45) Date of Patent: Feb. 26, 2008

(54) TARGETED MARKETING SYSTEM AND METHOD

(75) Inventors: Linda M. Smith, Woodland Hills, CA (US); Darren D. Lu, Irvine, CA (US)

(73) Assignee: FaceCake Marketing Technologies, Inc., Calabasas, CA (US)

( * ) Notice: Subject to any disclaimer, the term of this patent is extended or adjusted under 35 U.S.C. 154(b) by 986 days.

(21) Appl. No.: 09/645,292

(22) Filed: Aug. 24, 2000

(51) Int. Cl.
*G06Q 30/00* (2006.01)
(52) U.S. Cl. ............................ 705/14; 705/26; 705/27; 382/162; 382/167; 382/274; 382/100; 382/118; 345/592; 345/429; 434/100
(58) Field of Classification Search ................. 705/14, 705/26, 27; 709/217; 382/162, 167; 345/592; 434/100
See application file for complete search history.

(56) References Cited

U.S. PATENT DOCUMENTS

| | | | |
|---|---|---|---|
| 4,539,585 A * | 9/1985 | Spackova et al. | 382/100 |
| 5,478,238 A * | 12/1995 | Gourtou et al. | 434/100 |
| 5,495,338 A * | 2/1996 | Gouriou et al. | 356/402 |
| 5,724,521 A * | 3/1998 | Dedrick | 705/26 |
| 5,990,901 A * | 11/1999 | Lawton et al. | 345/581 |
| 6,199,106 B1 * | 3/2001 | Shaw et al. | 709/217 |
| 6,216,129 B1 * | 4/2001 | Eldering | 705/36 R |
| 6,513,015 B2 * | 1/2003 | Ogasawara | 705/26 |
| 6,937,755 B2 | 8/2005 | Orpaz et al. | |

FOREIGN PATENT DOCUMENTS

WO  WO 97/41673  * 6/1997

OTHER PUBLICATIONS http://eddybauer.com.*
www.marykay.com; www.marykay.com/whatsnew/virtualmakeover/default.aspx, Mary Kay Inc.
www.ezface.com; (www.ezface.com/ActiveX/index.html, EZface Inc.

* cited by examiner

*Primary Examiner*—Jean D. Janvier
(74) *Attorney, Agent, or Firm*—Manatt, Phelps and Phillips, LLP

(57) ABSTRACT

A computer-implemented method for targeting marketing content to an online user, includes the steps of collecting data describing the user in a user profile, comparing the user profile with a target profile and presenting the user with content based on the comparison. The user profile includes a photographic likeness of the user, as well as information derived from the user's photographic likeness. Certain content may be dynamically created for the user based on the user profile and may include the photographic likeness of the user, which may be altered to incorporate a portion of the content into the photographic likeness. In this manner, personalized advertisements for cosmetics, jewelry, clothing and other items may be created. The user profile also includes data describing the user's browsing habits and responses to context-specific survey questions. In one embodiment, metrics are assigned to the user profile data, and a data index identifying the user's preferences and purchasing habits is calculated for the user based on the assigned metrics. Each metric may also have an associated confidence factor, which causes the metric value to decay over time.

4 Claims, 6 Drawing Sheets

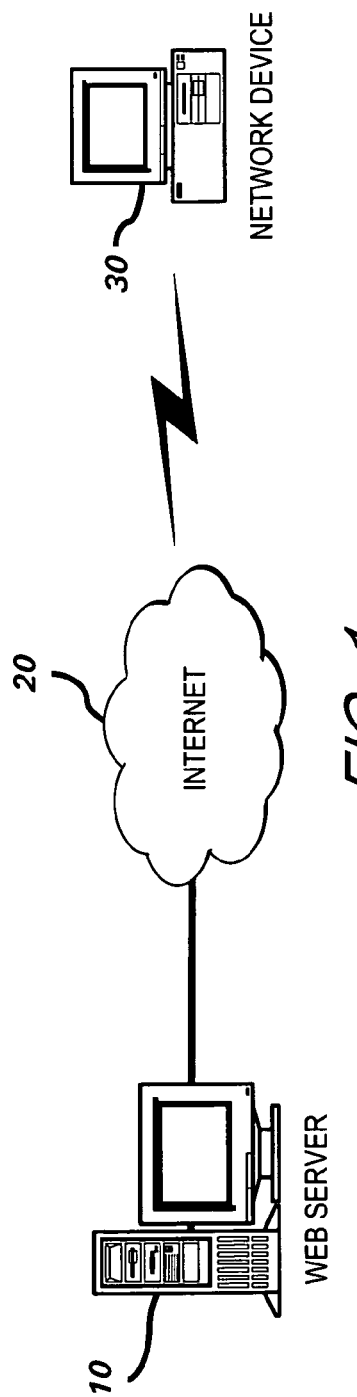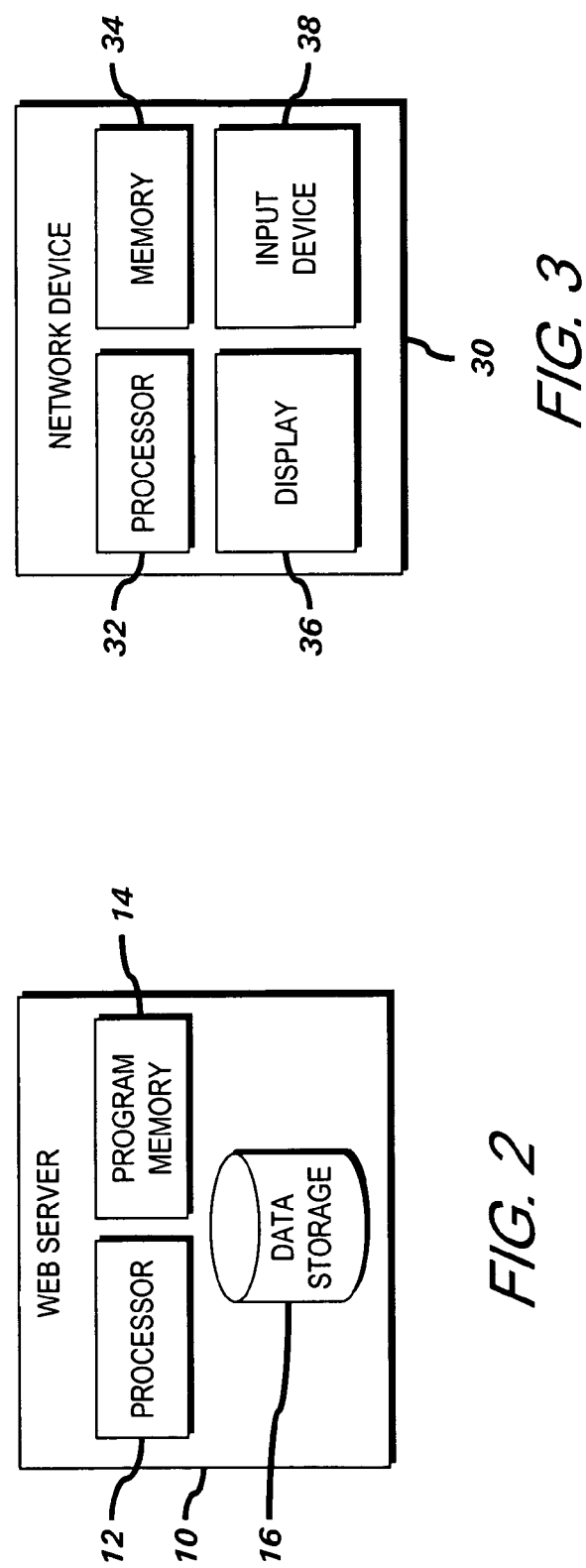

| Event | Date | Time |
|---|---|---|
| Go to Web Page A | August 22, 2000 | 12:01 p.m. |
| Click Link to Web Page B | August 22, 2000 | 12:05 p.m. |
| Click Link to Web Page C | August 22, 2000 | 12:05 p.m. |
| Click through Ad D | August 22, 2000 | 12:16 p.m. |
| Click link to Web Page E | August 22, 2000 | 12:17 p.m. |

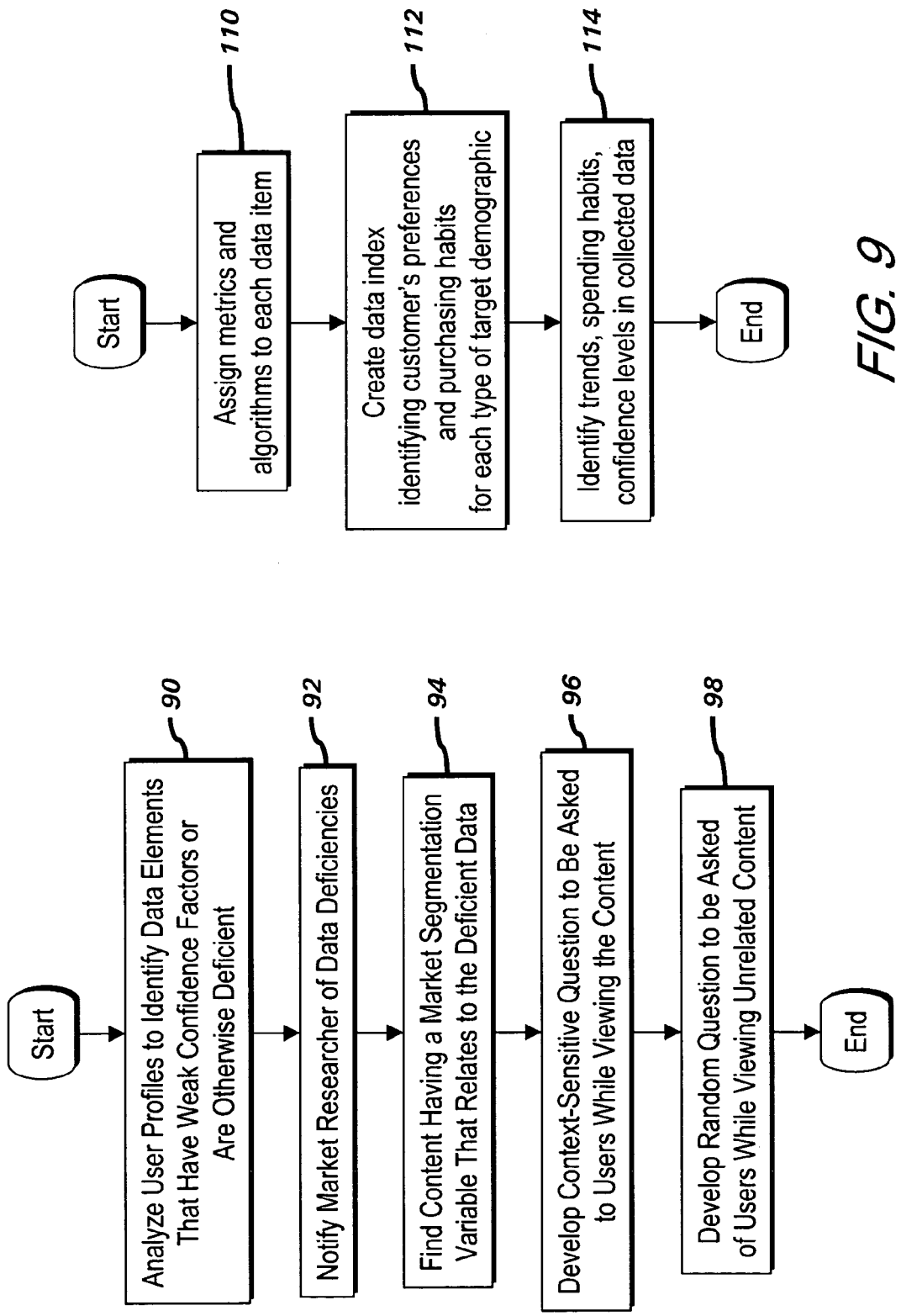

TARGETED MARKETING SYSTEM AND METHOD

BACKGROUND OF THE INVENTION

1. Field of the Invention

The present invention relates to targeted marketing, and in particular to systems and methods for personalizing marketing materials, advertisements, entertainment, educational materials, and other content to the individual preferences of Internet users.

2. Description of Related Art

Targeted marketing through the Internet is well known in the art. Individuals who navigate the World Wide Web ("Web") portion of the Internet are frequently presented with advertisements, promotions, and other content (collectively "content") targeted to their demographic and psychographic attributes, and other individual preferences and characteristics. In a typical scenario, an advertiser, promoter or other entity (collectively "content provider") selects a set of target demographics and/or psychographics ("target profile") for its content and makes the content accessible to Internet users through a Web site. The Web site operator, or another affiliated entity, maintains a user profile for each of its registered (or otherwise identifiable) users. Each user profile includes data fields for storing known attributes of its associated user, which may include name, address, telephone number, e-mail address, gender, age, race, and other personal information. When an individual accesses a Web site that includes a plurality of targeted content, the individual's user profile is compared against the target profile for the available targeted content, and the targeted content having a target profile that best fits the individual is displayed to the individual on the Web page.

The effectiveness of targeted marketing often depends on the quantity and quality of data collected for each user. For example, a primary source of user data is an online survey or questionnaire. Many Web sites require new users to establish an online profile before permitting access to certain Web pages or services. Each new user is prompted to provide the user's name, address, telephone number, gender, age, e-mail address and other demographic information. However, many users are reluctant to provide such private information over the Internet and set up "dummy" profiles with false data. Further, users are often reluctant to fill out a lengthy questionnaire that requires detailed answers, thus limiting the amount and type of information collected through this approach.

Additional user information is often collected by tracking the occurrence of certain user initiated events. For example, one common approach creates a log entry each time a user clicks through a displayed advertisement. Each user's online purchases made through the Web site may also be logged in the user profile. These events may be tracked through server-based programs and/or software executing on the user's computer. The data collected through these approaches is typically limited to a small subset of the user's actual online behavior, and attempts to correlate this behavioral data with user psychographics have proven to be inadequate.

In view of these and other limitations in the prior art, there is a need for a targeted marketing system and method that collects detailed and accurate user profile data and matches user profile data to target demographic and psychographic attributes in a meaningful manner. Further, there is a need for a way to use such collected data to create and provide advertisements, promotions or other content that will attract the user's attention.

SUMMARY OF THE INVENTION

The present invention provides a system and method for delivering targeted marketing to online users. In a preferred embodiment, psychometric information and a photographic likeness of a user are collected for use in personalizing marketing, advertising, entertainment, educational materials and other content.

In a preferred embodiment, at least one Web server and at least one network device are connected through a network, such as the Internet. The Web server may be any computing device that provides World Wide Web services on the Internet, and the network device may be any device that is adapted to access and navigate Web pages from the Web server through the Internet. Each user of the Web server registers through a registration Web page, which queries the user for basic demographic information such as name, address, telephone number, age, gender and income. The user registration includes the creation of a user profile, which is used by the Web server to store data associated with the registered user.

A preferred user profile includes initial survey responses provided by the user during registration, data describing the user's Web browsing habits and Web purchasing patterns, a photographic likeness of the user, context-specific survey responses and random survey responses. The user profile is analyzed to prepare a summary of the user's personality, buying motives, interests, activities, opinions and other characteristics.

The user's actions on each Web page provide insights into the user's preferences for the content available on the Web page. Each Web page includes one or more pieces of content, which may include text articles, banner ads, pictures, videos, audio files, etc. The Web site operator, advertiser, or other entity may select zero or more market segmentation variables to be associated with each piece of content, and assign metrics to be given upon the occurrence of each action. The associated metric value depends on various factors such as the user action and the number of times this user action has been recorded for the particular content. The data stored in the user profile, such as the user's demographic and psychographic data, may also include an associated confidence factor that reduces the value of a metric, or the weight given to a data element, over time.

In a preferred embodiment, the user is encouraged to transmit the user's photographic likeness to the Web server for storage in the user's profile. Each image preferably includes a picture of the user's head and shoulders against a solid background. The photographic likeness is processed by converting the image to a standard image format, and then identifying facial features from the image. Additional data is also collected from the picture for storage in the user profile such as the user's hair, color, eye color, skin tone, face shape, and other information that may be derived from the photographic image.

Context-specific survey questions and random survey questions are asked periodically to verify weak data elements or supply missing data elements. These survey questions are less intrusive than a lengthy questionnaire and can be used throughout the Web site to gather information. In a preferred embodiment, the user profiles are analyzed in view of the target demographics and psychographics of the available content to identify data elements that have generally weak confidence factors or are otherwise deficient for use in accurately targeting the available content. The market researcher is then notified of the deficiencies in the data and a search is conducted to locate content having an associated market segmentation variable that relates to the deficient data element. Next, the market researcher is prompted to develop a context-specific survey question that relates to the content, the answer to which supplies the deficient data element. The market researcher is also prompted to develop a random survey question, the answer to which supplies to the deficient data element. Random questions may be presented to the user periodically, even while the user is viewing unrelated content.

The collected data in the user profile is also used to target specific content to the user. When selecting content to display to the user, the Web server automatically selects the content with target demographics and psychographics that best matches the user's data index calculated from the user profile. In addition, on certain Web pages, content that best matches the user's data index may be displayed more prominently to the user than other content displayed on the Web page.

The user profile may also be used to create personalized advertisements, marketing materials, entertainment, or educational materials for an individual user. For example, the user's likeness may be altered to reflect the approximate look of specific jewelry, accessories, hairstyles, clothing, and other items. The altered image may then be displayed to the user as part of a Web page, print advertisement, email, or other content. Clothing may be illustrated on a body image that closely matches the user's body measurements (or clothing sizes) recorded in the user profile. The user's likeness may also be altered to simulate the user in different locations, anatomical poses, and video or audio situations.

A more complete understanding of the Targeted Marketing System and Method will be afforded to those skilled in the art, as well as a realization of additional advantages and objects thereof, by a consideration of the following detailed description of preferred embodiments. Reference will be made to the appended sheets of drawings, which will first be described briefly.

BRIEF DESCRIPTION OF THE DRAWINGS

FIG. 1 illustrates a preferred environment for operating the present invention;

FIG. 2 is a block diagram illustrating the components of a preferred web server;

FIG. 3 is a block diagram illustrating the components of a preferred network device;

FIG. 8 is a flow diagram illustrating the preferred steps in creating context-sensitive and random survey questions;

FIG. 9 is a flow diagram illustrating the preferred step of analyzing user profile data.

DETAILED DESCRIPTION OF THE PREFERRED EMBODIMENTS

Figures 4, 5:
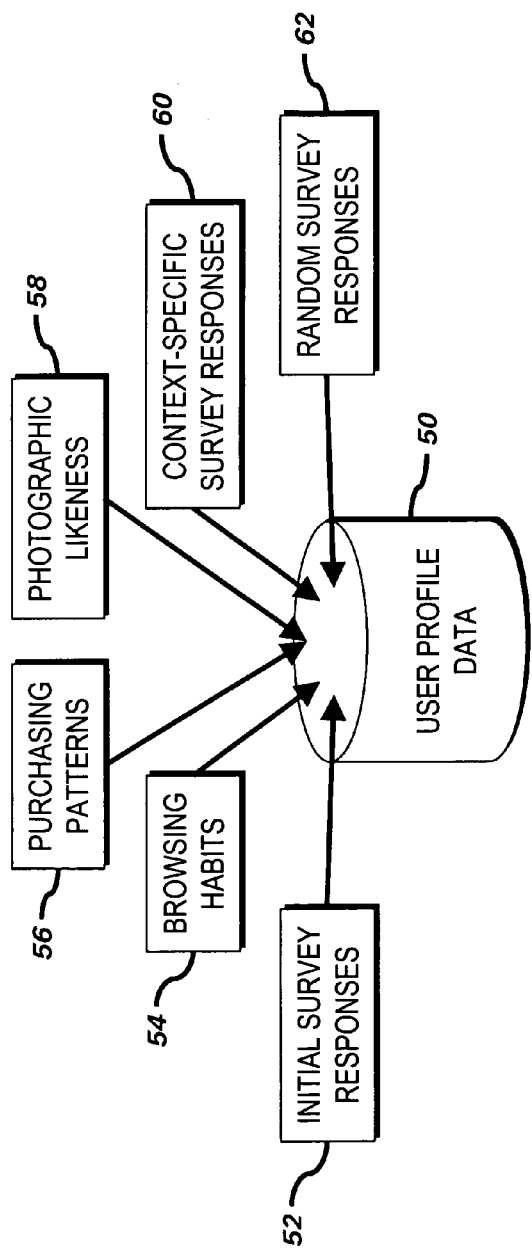
FIG. 4 illustrates a preferred embodiment of user profile data.
FIG. 5 illustrates a preferred database table used for logging user initiated events.

The present invention provides a system and method for delivering targeted marketing to online users. In a preferred embodiment, psychometric information and a photographic likeness of a user are collected for use in personalizing marketing, advertising, entertainment and educational materials, and other content (collectively "content"). In the detailed description that follows, like element numerals are used to describe like elements illustrated in one or more of the aforementioned figures.

A preferred embodiment of the present invention is illustrated in FIG. 1, and includes at least one Web server 10 and at least one network device 30 connected through a network 20, such as the Internet. The Web server 10 may be any computing device that provides World Wide Web services on the Internet. As illustrated in FIG. 2, the Web server 10 preferably includes a processor 12, a program memory 14 for storing program instructions, and a data storage 16 for storing targeted content, Web pages, user profile data and other targeted marketing information. The features of the Web server 10 described herein may be embodied on a plurality of computing devices, which may reside in a plurality of locations. The network device 30 is adapted to access and navigate Web pages from the Web server 10 through the Internet 20, and may include a personal computer, a Wireless Application Protocol telephone, or an Internet appliance. As illustrated in FIG. 3, the network device 30 preferably includes a processor 32, a memory 34, a display 36 and an input device 38 such as a mouse and a keyboard.

In operation, a user of the network device 30 accesses Web pages stored on the Web server 10 through a browser application. As known in the art, the Web server 10 may be accessed by entering its Uniform Resource Locator ("URL") into the Web browser. The Web server 10 preferably includes a home page providing links to other user accessible Web pages on the Web server 10, a registration Web page for collecting user profile information from new users, a login Web page for identifying registered users, and stored content. The stored content may include articles, pictures, advertisements, promotions, products and services offered for sale, and other targeted content. In a preferred embodiment, each user is required to register with Web server 10 in order to gain access to certain content stored on the Web server 10. A new user is registered through the registration page, which queries the user for basic demographic information such as name, address, telephone number, age, gender and income. In subsequent visits to the Web server 10, the user may be identified by the Web server 10 through the user of a user name and password, through cookies stored on the network device 30, or any other identification method that links the user to stored data associated with the user.

The user registration includes the creation of a user profile, which is used by the Web server 10 to store data associated with the registered user. As illustrated in FIG. 4, a preferred user profile 50 includes initial survey responses 52 provided by the user during registration, data describing the user's browsing habits 54 and purchasing patterns 56, a photographic likeness of the user 58, context-specific survey responses 60 and random survey responses 62. The data collected in the user profile 50 is analyzed by the Web server 10 to identify the user's preferences, purchasing habits and computer operation proficiency. It is contemplated that multiple user profiles 50 may also analyzed to identify trends and spending habits of the aggregate user group.

In a preferred embodiment, after a user logs onto the Web server 10, the user's actions are tracked until the user logs off or leaves the Web site. The user may be tracked by detecting user initiated requests at the Web server 10, by detecting user initiated events through software executing on the user's network device 30 and then transmitting the logged events to the Web server 10, or by other methods known in the art. FIG. 5 illustrates a preferred database table for storing the data describing the user's browsing habits 54. The table includes a sequence of events and the date and time at which each event was detected. The user initiated events that may be tracked include, but are not limited to, selecting a link to another Web page, clicking through an advertisement and printing the current Web page. The user's Web purchases 56 may be tracked in a similar manner, i.e., by logging the date, time and amount of the purchase, an item identifier, the quantity purchased, payment method and shipping address.

The data describing the user's browsing habits 54, along with the other data from the user profile 50, is analyzed to prepare a profile of the user's personality, buying motives, interests, activities, opinions and other characteristics. In a preferred embodiment, market segmentation variables are pre-selected by the content providers based on the target demographics and psychographics each content provider is attempting to reach. The user profile 50 is then analyzed to determine user values for each of these pre-selected market segmentation variables. For example, the content provider may target its content to a particular Value and Lifestyle Survey (VALS) category. As known in the art, VALS places consumers into one of nine mutually exclusive lifestyle categories based on their psychology and key demographics. These categories have been found to be strong predictors of a variety of consumer preferences in products, services, and media. Other psychographic market segmentation variables may also be used, such as variables describing personality traits (e.g., reserved v. outgoing; dull v. bright; trusting v. suspicious).

Figure 6:
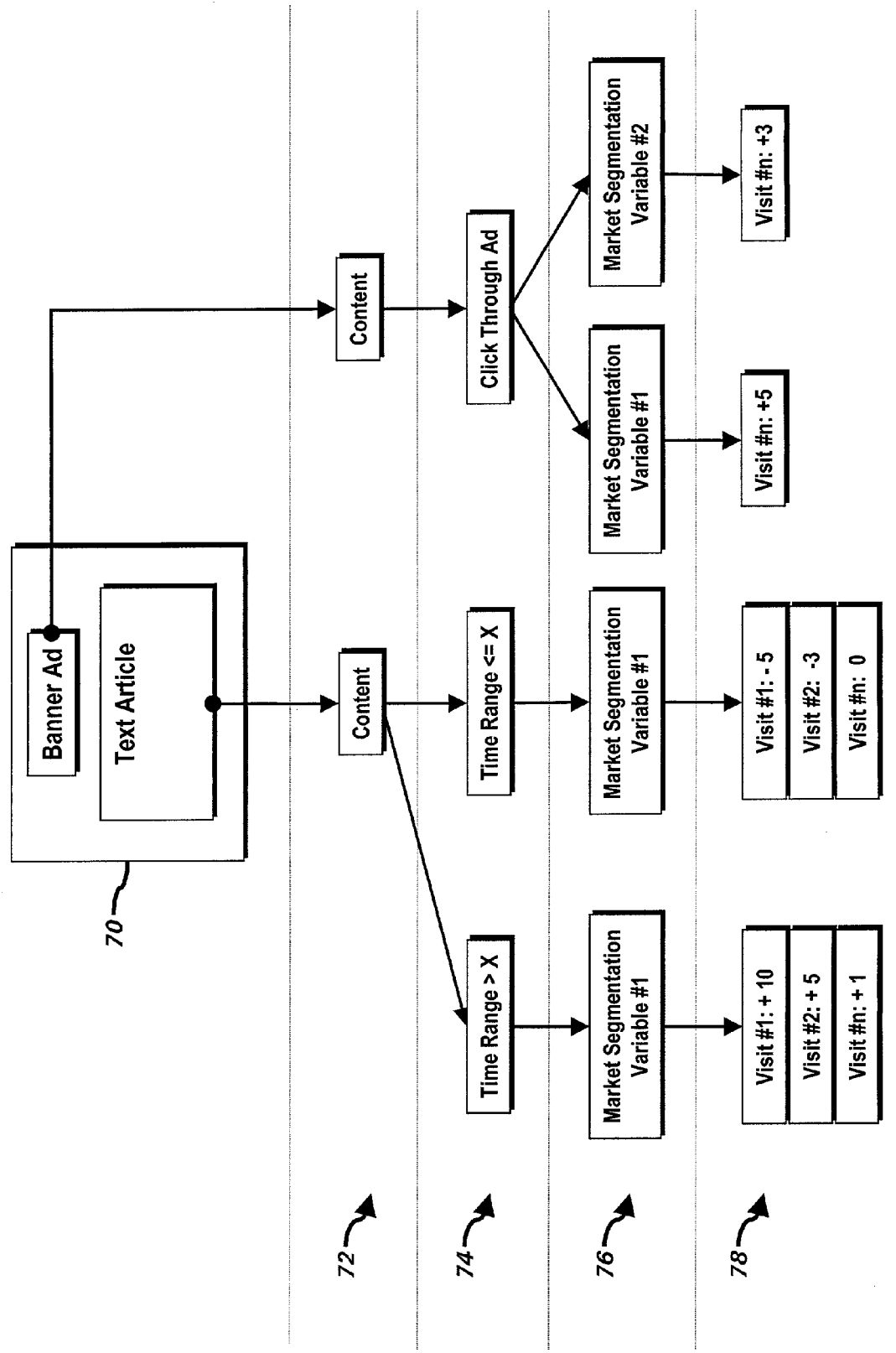
FIG. 6 illustrates the assignment of metric values to user initiated events in a preferred embodiment.

A preferred analysis of the data describing the user's browsing habits 54 will now be described with reference to FIG. 6. Each Web page 70 includes one or more pieces of content 72, which may include text articles, banner ads, pictures, videos, audio files, etc. The user's actions 74 on the Web page 70 provide insights into the user's preferences for the content 72 available on the Web page 70. For example, if the user immediately hits the "Back" button on the user's browser when the Web page 70 is displayed (e.g., the time spent on the Web page 70 is less than a predetermined value X), it could indicate that the user has little interest in the displayed content 72. The Web site operator, advertiser, or other entity may select zero or more market segmentation variables 76 to be associated with each piece of content 72. This selection is preferably performed manually by a market researcher to determine the market segmentation variables 76 to associate with the content 72, and the values to give the metrics 78 upon the occurrence of each action. In a preferred embodiment, each market segmentation variable has a metric value from 0 to +100 that indicates the value of the user action for that market segmentation variable. The assigned metric value may depend on various factors such as the user action and the number of times this user action has been recorded for the particular content.

The data stored in the user profile 50, such as the user's demographic and psychographic data, may also include an associated confidence factor. In a preferred embodiment, the confidence factor is a decay function that reduces the value of a metric, or the weight given to a data element, over time. A market researcher preferably sets the confidence factor for each data element based on the type of data and the researcher's confidence in the data source. For example, there may be a high level of confidence in a residential address entered by a user for the delivery of items purchased online. In such a scenario the market researcher may remain confident in the accuracy of the address more than one year from the date of entry, and may set the confidence in the data to be reduced 10% every year. The market researcher may have a much lower level of confidence in other data, for example, the user's "favorite movie." Because a user's favorite movie may change frequently over time, the market researcher may set the confidence level to be reduced more often, for example, a reduction of 50% every three months.

Figure 7B:
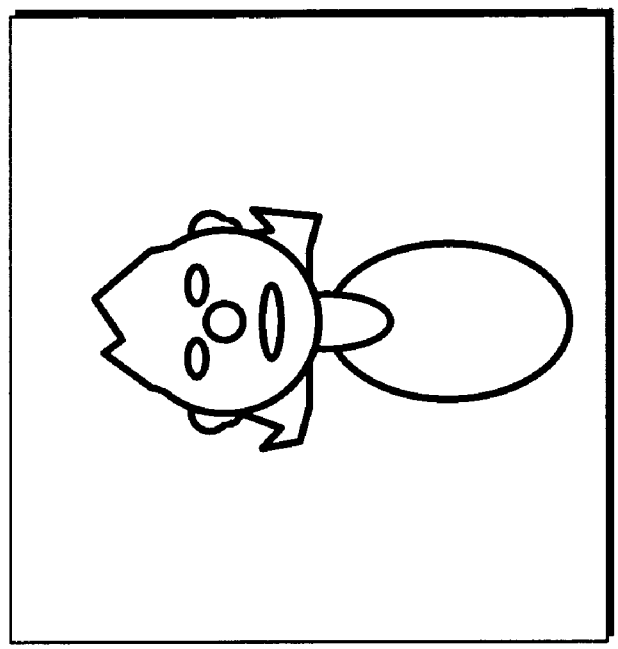
FIGS. 7*a-b* illustrate a preferred processing of a photographic likeness.
Figure 7A:
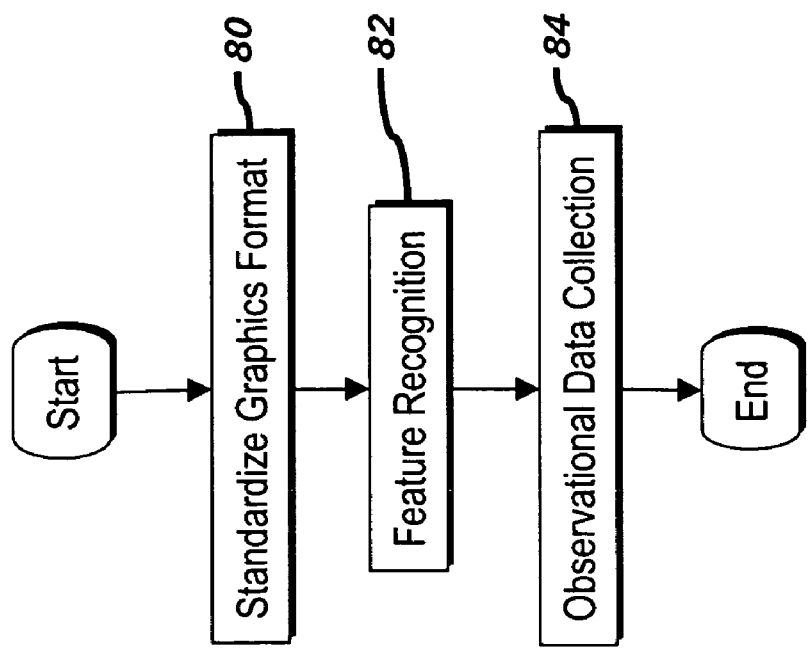

As discussed above, the user is encouraged to transmit the user's photographic likeness 58 to the Web server 10 for storage in the user's profile 50. If the photographic likeness 58 is a computer graphics file (e.g., JPEG or GIF) then the user may email or otherwise transmit the graphics file to the Web server 10. In a preferred embodiment, the user may alternatively send a photograph to the Web site operator who will create a digital image of the photograph for storage in the user profile. The photographic likeness 58 is processed according to the preferred steps illustrated in FIG. 7a. In Step 80, the photographic image is converted to a standard image format. In the preferred embodiment, each image include a picture of the user's head and shoulders, against a solid background, as illustrated in FIG. 7b. This step may include cropping the image and changing the file size, image dimensions, number of colors and file type. In Step 82, the features of the face in the photographic likeness 58 are identified. This step may be performed manually by a graphics editor, or automatically through facial feature recognition software known in the art. In the preferred embodiment, the location of the user's eyes, eyelids, cheeks, ears, lips, neckline, hairline and other facial features are identified on the two-dimensional image and stored in the user profile 50. In Step 84, additional data is collected from the picture for storage in the user profile 50. For example, the user's hair color, eye color, skin tone, face shape, and other information that may be manually determined from the photographic image and recorded in the user profile 50.

Context-specific survey questions and random survey questions are asked periodically to verify weak data elements or supply missing data elements. These survey questions are less intrusive than a lengthy questionnaire and are preferably used throughout the Web site to gather needed information. A preferred embodiment for the implementation of context-specific and random survey questions is illustrated in FIG. 8. First, in Step 90, the user profiles are analyzed in view of the target demographics and psychographics of the available content to identify data elements that have generally weak confidence factors or are otherwise deficient for use in accurately targeting the available content. In a preferred embodiment, this identification of deficient data elements is based on each element's statistical reliability. The market researcher is notified of the deficiencies in the data in Step 92. For each deficient data element, a search is conducted in Step 94 to locate content having an associated market segmentation variable that relates to the deficient data element. In Step 96, the market researcher is prompted to develop a context-specific survey question that relates to the content, the answer to which supplies the deficient data element. For example, if a user is browsing for a pair of shoes, a question asking for the user's shoe size (i.e., the deficient data in this example) would appear to the user as a helpful shoe finding aid, while providing the deficient data about the user. Such web-content refinement inquiries may be used to query for needed information in a relatively non-intrusive manner and will often yield a more accurate user response than other data collection methods. In a preferred embodiment, the context-specific survey question is presented to the user in a new browser window when the associated content is displayed to the user. In Step 98, the market researcher is prompted to develop a random survey question, the answer to which supplies the deficient data element. Random questions may be presented to the user periodically, even while the user is viewing unrelated content.

The number of survey questions, both context-sensitive and random, presented to the user is preferably limited to avoid overburdening the user. In a preferred embodiment, the number of survey questions asked of the user is limited by allowing a predetermined amount of time to pass between each survey question. For example, context-sensitive questions, which are considered less intrusive to the user than random questions, may be skipped until after the passing of a first predetermined interval of time, and random questions, which are considered more intrusive to the user, may be asked after the passing of a second predetermined interval of time, which is longer than the first predetermined interval of time.

Through the data collection methods described above, the user profile 50 may include the user's personal contact information and demographic information, two or three dimensional images of the user, audio of the user, video of the user, the user's body measurements, purchasing habits, purchasing history, entertainment preferences, lifestyle habits, political beliefs, affiliations, religious beliefs, opinions about specific marketing, advertising, entertainment or educational materials, opinions about current news and cultural issues, web surfing habits, and other information that describes the user. It will be appreciated that the use of the data collection procedures described herein does not preclude the collection of data through other methods, such as telephone surveys.

The collected data in the user profile 50 is used to target specific content to the user as illustrated in FIG. 9 (and as discussed above with reference to FIG. 6). In Step 110, each data item is assigned metrics and algorithms, and the results are used in Step 112 to create a data index identifying the user's preferences, habits, etc., with respect to each particular target demographic or psychographic type being used by the content providers. When selecting content to display to the user, the Web server 10 will automatically select the content with target demographics and psychographics that best matches the user's data index. In addition, on certain Web pages, content that best matches the user's data index is displayed more prominently to the user than other content displayed on the Web page. For example, an advertisement may be prominently displayed to certain targeted users on the top of a Web page and placed on the bottom of the screen for other users. Further, Web links displayed on the Web page may be arranged in an order that best illustrates the user's preferences for the links.

Figure 10:
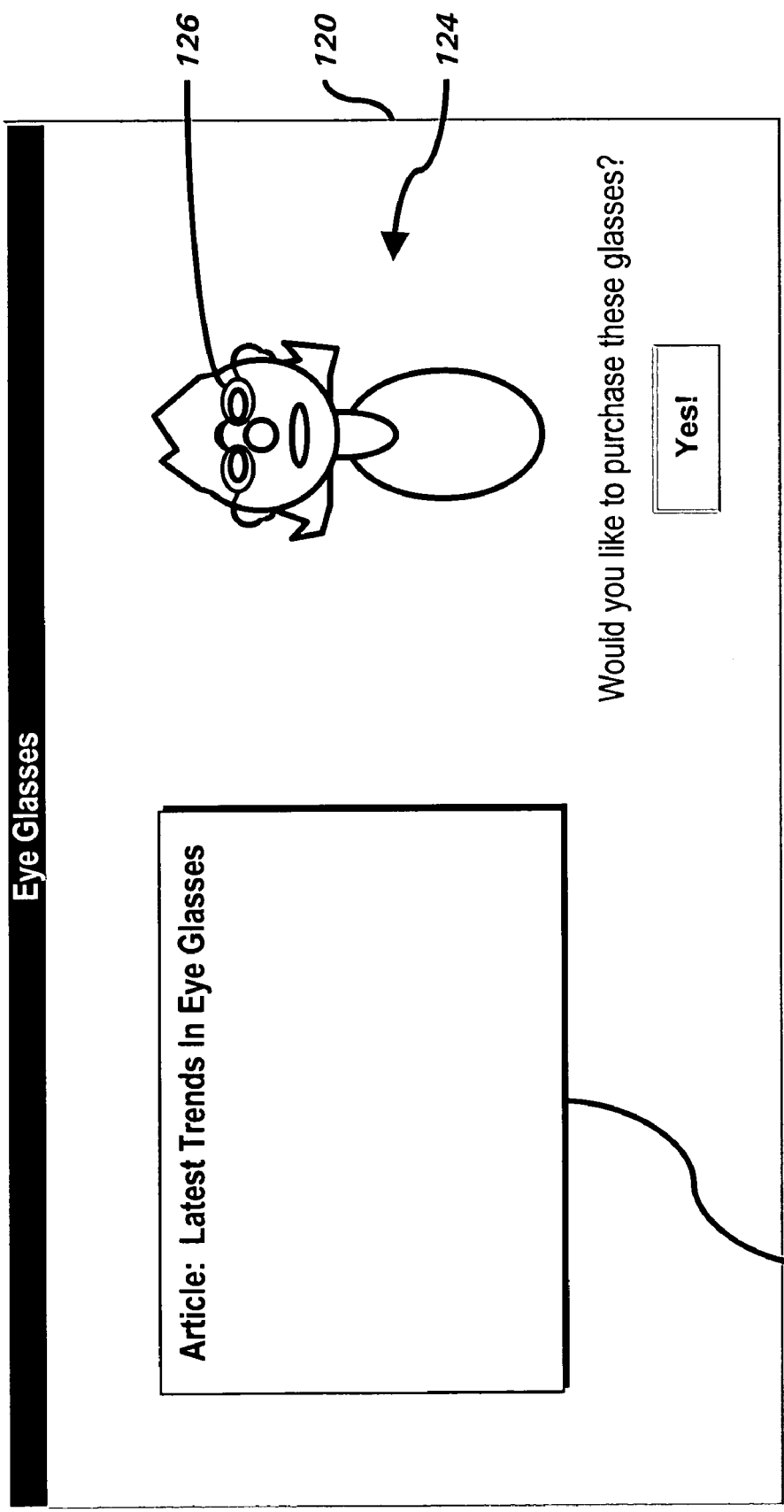
FIG. 10 illustrates one example of the incorporation of a photographic likeness into content.

In the preferred embodiment, the collected and analyzed data, including the psychographic information and the user's photographic likeness, are also used to create personalized advertisements, marketing materials, entertainment, or educational materials for an individual user. The customer may be identified by reading a client identifier on the customer's machine, in the form of a cookie, a machine authentication code and IP address, a username and login, or any other method as known in the art. An example of a targeted promotion is illustrated in FIG. 10. A Web page 120 includes an article 122 describing the latest trends in eyeglasses, and the photographic likeness of the user 124. Using user profile information, a pair of eyeglasses is selected from the article that best match the user's skin tone, face shape and purchasing habits. The eyeglasses 126 are incorporated into the image allowing the user to see how the eyeglasses would look on the user's face. The eyeglasses are placed on the user's face in accordance with the location of the user's eyes, nose and ears, identified when the photographic likeness was first processed. The user may also be given the option of viewing other eyeglasses on the image.

In another contemplated embodiment, the user's photographic likeness is used to present cosmetic recommendations to the user. A fashion consultant can view the photographic likeness and select makeup colors that best suit the user's facial features. The cosmetics are then applied to the user's image as part of a personalized advertisement for the cosmetics. The advertisement may include an interface allowing the user to select and view different shades and colors, and make online purchases. In other embodiments, the user's likeness may be altered to reflect the approximate look of specific jewelry, accessories, hairstyles, clothing, and other items. Clothing may be illustrated on a body image that closely matches the user's body measurement (or clothing sizes) recorded in the user profile. The user's likeness may also be altered to simulate the user in different locations, anatomical poses, and video or audio situations. For example, an advertisement for a ski vacation may include an action image of the user skiing down a mountain.

Having thus described a preferred embodiment of the Targeted Online Marketing System and Method, it should be apparent to those skilled in the art that certain advantages of the within described system have been achieved. It should also be appreciated that various modifications, adaptations, and alternative embodiments thereof may be made within the scope and spirit of the present invention. The scope of the present invention is defined by the following claims.

What is claimed is:

1. A method for targeting marketing content to a user, each targeted content having an associated target profile defined by market segmentation variables, comprising the steps of:

collecting data elements describing the user in a user profile, the data elements include a photographic likeness of the user;

assigning metrics to the data elements in the user profile, the data elements include confidence factors that decay over time;

using the assigned metrics, creating data indices corresponding to the market segmentation variables, wherein the data indices identify user's preferences or purchasing habits with respect to the market segmentation variables;

comparing the data indices to the market segmentation variables of the target profile associated with each content to select content that best matches the data indices;

altering the photographic likeness of the user to incorporate the selected content into the photographic likeness of the user; and presenting the user with the altered photographic likeness of the user.

2. The computer-implemented method of claim 1 wherein the step of assigning metrics includes assigning metrics to information derived from the user's photographic likeness.

3. The computer-implemented method of claim 1 wherein the photographic likeness is altered to simulate the application of cosmetics on the photographic likeness.

4. The computer-implemented method of claim 1 wherein the photographic likeness is altered to simulate the wearing of clothing.

* * * * *